(12) United States Patent
Hak et al.

(10) Patent No.: US 12,391,079 B2
(45) Date of Patent: Aug. 19, 2025

(54) INDUSTRIAL TRUCK WITH A JAW COUPLING, A SYSTEM INCLUDING AN INDUSTRIAL TRUCK AND A TRAILER, AND A METHOD FOR COUPLING A TRAILER TO AN INDUSTRIAL TRUCK

(71) Applicant: Jungheinrich AG, Hamburg (DE)

(72) Inventors: Ralf Hak, Hamburg (DE); Jan Rieckmann, Scharnebeck (DE); Hinrich Meyer, Barnstedt (DE); Gunnar Jahn, Hamburg (DE); Konstantin Zizer, Lüneburg (DE); Joscha Bassanello, Lüneburg (DE)

(73) Assignee: Jungheinrich AG, Hamburg (DE)

(*) Notice: Subject to any disclaimer, the term of this patent is extended or adjusted under 35 U.S.C. 154(b) by 707 days.

(21) Appl. No.: 17/361,403

(22) Filed: Jun. 29, 2021

(65) Prior Publication Data

US 2022/0001708 A1 Jan. 6, 2022

(30) Foreign Application Priority Data

Jul. 2, 2020 (DE) ..................... 10 2020 117 511.6

(51) Int. Cl.
*B60D 1/36* (2006.01)
*B60D 1/00* (2006.01)
(Continued)

(52) U.S. Cl.
CPC ............. *B60D 1/363* (2013.01); *B60D 1/02* (2013.01); *B60D 1/246* (2013.01); *B60D 2001/005* (2013.01)

(58) Field of Classification Search
None
See application file for complete search history.

(56) References Cited

U.S. PATENT DOCUMENTS

2003/0178810 A1* 9/2003 Reiter ..................... B60D 1/02
  280/477
2010/0096203 A1* 4/2010 Freese, V .......... B62D 15/0285
  701/37

(Continued)

FOREIGN PATENT DOCUMENTS

DE 1780613 A1 5/1971
DE 3909087 A1 9/1990
(Continued)

OTHER PUBLICATIONS

"Rainer Hübner, Truck with a trailer hitch and procedure for its operation, Apr. 18, 2019" NPL attached (Year: 2019).*

*Primary Examiner* — Abby J Flynn
*Assistant Examiner* — Bakari Underwood
(74) *Attorney, Agent, or Firm* — Rankin, Hill & Clark LLP

(57) ABSTRACT

An industrial truck (21) with a jaw coupling (1) that includes a coupling body (22) and a coupling pin (4), a system including such an industrial truck and a trailer (40), and a method for coupling the trailer to the industrial truck. The industrial truck includes a control unit (28), at least one locking sensor (17) and a locking actuator (8). The locking sensor is configured to recognize whether a coupling eye (26) of a drawbar (18) of a trailer is located in a locking position within the coupling body. The control unit is configured to receive and evaluate signals from the locking sensor and, when the locking sensor recognizes that the coupling eye is located in or near the locking position, the control unit is configured to control the locking actuator so that it actuates the coupling pin such that the coupling pin is shoved through the coupling eye.

19 Claims, 6 Drawing Sheets

(51) Int. Cl.
B60D 1/02 (2006.01)
B60D 1/24 (2006.01)

(56) References Cited

U.S. PATENT DOCUMENTS

| | | | | |
|---|---|---|---|---|
| 2018/0194195 A1* | 7/2018 | Bryant | ................... | F25D 29/001 |
| 2019/0220005 A1* | 7/2019 | Flottran | ................ | G05D 1/0055 |
| 2020/0198420 A1* | 6/2020 | Scheer | ................... | B60D 1/025 |

FOREIGN PATENT DOCUMENTS

| | | | |
|---|---|---|---|
| DE | 19931746 | A1 | 8/2000 |
| DE | 10011442 | A1 | 9/2001 |
| DE | 69705591 | T2 | 5/2002 |
| DE | 102007046677 | A1 | 4/2009 |
| DE | 102010004920 | A1 | 7/2011 |
| DE | 102017123882 | A1 * | 4/2019 |
| DE | 102016104197 | A1 | 5/2019 |
| EP | 3047986 | A1 | 7/2016 |
| EP | 3511289 | A1 | 7/2019 |
| WO | 2018228944 | A1 | 12/2018 |

* cited by examiner

INDUSTRIAL TRUCK WITH A JAW COUPLING, A SYSTEM INCLUDING AN INDUSTRIAL TRUCK AND A TRAILER, AND A METHOD FOR COUPLING A TRAILER TO AN INDUSTRIAL TRUCK

BACKGROUND OF INVENTION

Field of Invention

The invention relates to an industrial truck with a jaw coupling that comprises a coupling body and a coupling pin. Furthermore, the invention relates to a system consisting of such an industrial truck and a trailer with a drawbar with a coupling eye. The invention furthermore relates to a method for coupling a trailer to an industrial truck, wherein the industrial truck is equipped with a jaw coupling that comprises a coupling body and a coupling pin.

Brief Description of Related Art

To supply material in industrial companies, tugger trains are used in many cases. Tugger trains are routinely not permanently assembled. A towing vehicle that in very general terms can be an industrial truck couples to a trailer group depending on the order, and transports it to the destination. At that location, the towing vehicle must be uncoupled from the trailer group. The coupling and uncoupling process is done manually in many cases which prevents the operation of the tugger trains from being fully automated.

A system that helps the driver of a motor vehicle with coupling a trailer is for example known from DE 10 2010 004 920 A1. With the device known from this document, the process of coupling a trailer to the motor vehicle such as a passenger car is simplified in that sensors of the passenger car's park assist are used to determine a relative position of the coupling of the trailer with respect to the position of the trailer coupling of the motor vehicle. For this purpose, the measurement data from the park assist which is frequently present in motor vehicles are evaluated. These are for example the ultrasonic sensors typically present in the bumper of the motor vehicle and the backup camera that is arranged in the rear of the motor vehicle. The coupling and uncoupling process itself must still be done by the user, however.

In DE 10 2007 046 677 A1, a method and a device are disclosed for coupling a trailer to an agricultural work machine. A detection system arranged on the work machine comprises at least one sensor that emits a locating beam in the direction of the trailer, or more precisely in the direction of its drawbar. A reflector is positioned thereupon that reflects the locating beam. To use such a system, it is however absolutely necessary for the drawbar of the trailer to be equipped with a corresponding reflector. However, this requirement leads to extensive retrofitting that can be uneconomical, especially with a large number of trailers.

BRIEF SUMMARY OF THE INVENTION

It is an object of the invention to provide an industrial truck with a jaw coupling, a system comprising an industrial truck and a trailer with a drawbar and a coupling eye, as well as a method for coupling such a trailer to such an industrial truck, wherein a fully automated coupling and uncoupling process is enabled.

The object is solved by an industrial truck with a jaw coupling that comprises a coupling body and a coupling pin, wherein this industrial truck is developed by a control unit, at least one locking sensor and a locking actuator that are coupled by communication technology to each other, wherein the locking sensor is configured to recognize whether a coupling eye of a drawbar of a trailer is located in or close to a locking position within the coupling body, wherein in the locking position, the opening in the coupling eye is flush with the coupling pin so that, to couple the trailer, the coupling pin can be shoved through the coupling eye, and wherein the control unit is configured to receive and evaluate signals from the locking sensor and, in an instance in which the locking sensor recognizes that the coupling eye is located in or near the locking position, the control unit is configured to control the locking actuator so that it actuates the coupling pin such that the coupling pin is shoved through the coupling eye.

Advantageously, a fully-automated coupling process is possible with such an industrial truck. The coupling process can moreover be electronically controlled which enables additional possibilities with respect to the automation of the industrial truck.

The industrial truck is advantageously developed such that the locking sensor is a contactless sensor, in particular an optical sensor.

The locking sensor is for example arranged so that a light beam is guided parallel to a rear wall or a base of the coupling body. If this is interrupted, it indicates that an outermost end of the coupling eye is located at or near the rear wall of the coupling body. In this position, the coupling eye is flush with the coupling pin, and it can be shoved through the coupling eye. Of course, different arrangements or designs of the locking sensor are conceivable, for example a proximity sensor that recognizes the presence of the coupling eye. Alternatively or in addition to the optical sensor, for example a capacitive or inductive sensor or another suitable sensor as well can therefore be provided.

According to another advantageous embodiment, the industrial truck is developed by a height adjustment ramp that extends between a first area close to the ground and a second area close to a section of the coupling body that forms a bottom part of the coupling mouth, wherein the height adjustment ramp extends in a direction facing away from the industrial truck in which the jaw coupling opens, and wherein the height adjustment ramp is configured to receive the coupling eye of the drawbar of the trailer and lead to a coupling height at which the coupling eye can be received by the jaw coupling.

The height adjustment ramp is in particular designed so that a gap still exists between ground on which the industrial truck is driving and an outermost end of the height adjustment ramp that ensures that the industrial truck can be easily driven within a provided area of use. The first area is therefore in particular close to the ground but is not in contact with the ground during the normal operation of the industrial truck.

Advantageously, the drawbar of a trailer can be received with the height adjustment ramp without the drawbar or the trailer having to be prepared or converted at great effort. Trailers can be coupled whose drawbars are located at different heights due to the design or wear. This significantly expands the possible uses of the industrial truck and prevents unnecessary investments in the vehicle fleet with respect to trailers.

Furthermore, the industrial truck is in particular equipped with an insertion funnel that expands, or respectively lengthens an opening in the coupling body in a direction in which the coupling body opens. Such an insertion funnel, that can have the form of a jacket of a frustum of a four-sided pyramid, guides the coupling eye in the direction of the coupling mouth. A precise approach of the coupling eye is unnecessary which would have to occur if the coupling eye would have to be introduced precisely into the mouth of the coupling body. Accordingly, the industrial truck can approach the trailer with a greater tolerance of error, which increases the turnover capacity of the industrial truck. If the industrial truck is provided with such an insertion funnel, a bottom section of the insertion funnel over which the coupling eye slides in the direction of the coupling body during the coupling process is considered part of the height adjustment ramp.

The industrial truck is furthermore developed in particular by a proximity sensor that is configured to detect the presence of the coupling eye within a sensor area, wherein the proximity sensor is coupled by communication technology to the control unit, and the control unit is configured to receive and evaluate signals from the proximity sensor and, in an instance in which the proximity sensor recognizes that the coupling eye is located in a sensor area, to control a traction drive of the industrial truck such that a driving speed of the industrial truck does not exceed a limit value for a provided approach speed. In particular, the sensor area is present within a section of the height adjustment ramp. However, the sensor area is also provided according to the aforementioned embodiment when the industrial truck is not provided with a height adjustment ramp. In such a case, the sensor area is provided in an area that extends behind the rear of the industrial truck.

The sensor area is for example located approximately in the middle between the first and the second area on the height adjustment ramp. Only when the coupling eye is located in this area is the travel speed of the industrial truck reduced. In particular, it is furthermore provided and advantageous when the industrial truck approaches at a speed that is maximally permissible without protection fields having to be used. For example, the industrial truck approaches the trailer at a speed of at least 0.25 m/s, in particular at a speed of at least approximately 0.3 m/s. This comparatively high approach speed is used in order to exploit the kinetic energy of the drawbar so that the drawbar moves up the height adjustment ramp without displacing the trailer. If an approach were to occur at a very low speed, the industrial truck would merely push away a light, e.g. empty trailer. It would however not be possible to move the drawbar of the trailer over the height adjustment ramp in the direction of the locking position. The mass inertia of the trailer is therefore used to bring the drawbar into the desired position. In this regard, it is advantageous if the approach speed is only reduced when the coupling eye is already approximately in the middle of the ramp.

According to another advantageous embodiment, the industrial truck is developed by a personal security sensor that is configured to monitor a personal protection safety area, wherein the personal protection safety area extends from a rear wall of the industrial truck in a direction facing away from the industrial truck in which the jaw coupling opens, wherein the personal security sensor is coupled by communication technology to the control unit, and the control unit is configured to receive and evaluate signals from the personal security sensor and, in an instance in which the personal security sensor recognizes that a person is located within the personal protection safety area, to control the locking actuator so that the coupling pin is not actuated as long as the person is located within the personal protection safety area.

The personal security sensor advantageously prevents a person at the jaw coupling from being injured. If, contrary to the express operating instructions, a person incorrectly reaches into the area of the coupling body, they could trigger the locking sensor in certain circumstances. At this moment, the person is however within the personal protection safety area. Consequently, the coupling pin is not actuated, and danger is excluded. If the industrial truck has a height adjustment ramp, the personal protection safety area extends between the ground on which the industrial truck is rolling and a bottom end of the height adjustment ramp.

According to another advantageous embodiment, the industrial truck is developed by at least one environment monitoring sensor that is configured to cover an additional protection field within an environment of the industrial truck, wherein the control unit is configured to establish whether the coupling pin is in an open or in a closed position, and wherein the control unit is configured to change a position, shape, extent and/or area of the additional protection field depending on the position of the coupling pin. The environment monitoring sensor is for example a separate monitoring sensor additionally attached to the industrial truck. It is however also provided for the additional protection field to use the sensors on the industrial truck. In other words, in the context of the present description, those sensors that are already in the industrial truck are therefore also considered environmental monitoring sensors provided that they are correspondingly used. It is also provided to not just change the additional protection field in terms of its position, shape, extent and/or area, but also for example to define more additional protection fields. The sensors on the industrial truck can in turn also be used for this. The protection field will be termed the additional protection field since industrial trucks, when operating autonomously as is common and known, use one or more protection fields to avoid collisions. The additional protection field supplements these protection fields provided and available in autonomous operation.

According to one exemplary embodiment, when the coupling pin is in the closed position, the control unit is configured to expand the additional protection field covered by the at least one environmental monitoring sensor to an area that extends from the jaw coupling in a direction facing away from the industrial truck in which the jaw coupling opens, and extends at least up to a given distance that in particular at least approximately corresponds to a drawbar length of a trailer.

The additional protection field is expanded to the area between the industrial truck and the trailer in such an instance in which the trailer is attached to the industrial truck. This area is therefore also safeguarded. The question as to whether this additional monitoring area, i.e., an expanded additional protection field, is or is not activated is made dependent on the actual position of the coupling. If the coupling is open and a trailer therefore cannot be attached to the industrial truck, the environment monitoring is withdrawn to the minimum extent. This prevents unnecessary violations of the safety areas that always cause the industrial truck to stop, and the turnover capacity of the industrial truck is increased.

According to another exemplary embodiment, it is provided that the control unit is configured to only activate the additional protection field in an area in which the jaw coupling is present when the control unit establishes that the coupling pin is in an open position, and the industrial truck is stationary or driving in reverse. This additional protection field covered by the at least one environment monitoring sensor also extends from the jaw coupling in a direction facing away from the industrial truck in which the jaw coupling opens, and namely at least up to a given distance that in particular corresponds at least approximately to a drawbar length of a trailer.

According to another advantageous exemplary embodiment, the control unit is configured to change the determination of a position, shape, extent and/or area of the additional protection field not just depending on the position of the coupling pin, but also depending on a steering angle of the industrial truck. In this context, it is in particular provided that the additional protection field is expanded on the right side of the industrial truck in the event of a rightward steering angle that exceeds a given limit value. Analogously, it is furthermore provided in particular that the additional protection field is expanded on the left side of the industrial truck in the event of a leftward steering angle that exceeds a given additional limit value. It is generally known that trailers travel a radius that lies further to the inside than the towing vehicle when cornering. To take into account this effect with regard to the design of the shape and size of the additional protection field, the aforementioned adaptations to the additional protection field can be made. It is also provided that the control unit is configured to define more additional protection fields. The expansion of the additional protection fields and the redefinition of further additional protection fields is carried out for example by using additional sensors arranged on the industrial truck.

Advantageously according to the aforementioned embodiments, an industrial truck that can be used as a towing vehicle is provided that on the one hand can be operated autonomously, and that on the other hand offers an extremely high level of security.

According to another advantageous embodiment, the industrial truck is developed in that the control unit is configured to establish that the locking actuator has shoved the coupling pin through the coupling eye and that a traction drive has then set the industrial truck in motion, wherein after the traction drive has set the industrial truck in motion, the control unit is furthermore configured to receive and evaluate signals from the locking sensor for at least a given time period and, in an instance in which an evaluation of the signals indicates that the coupling eye is not located in the locking position, to stop the traction drive of the industrial truck.

This advantageously ensures that while the industrial truck is approaching, the trailer is actually attached and locked in the jaw coupling. If the coupling process should be unsuccessful for any reason, the industrial truck automatically stops. A corresponding warning message can be output so that the coupling process can be done manually, and/or the error that may exist can be rectified.

The industrial truck is furthermore developed in particular by an actuating element that is configured to manually control the locking actuator so that it actuates the coupling pin such that the coupling pin is shoved through the coupling eye. The option of manual actuation facilitates the above-described coupling process that may have to be manually repeated.

According to another advantageous embodiment, the industrial truck is a driverless transport vehicle. For driverless transport vehicles, a fully automated coupling and uncoupling process is particularly advantageous.

The object is furthermore solved by system consisting of an industrial truck according to one or more of the aforementioned embodiments, and a trailer with a drawbar with a coupling eye. The same or similar advantages apply to the system as were previously mentioned with respect to the industrial truck itself, and therefore repetitions will be omitted.

The object is furthermore solved by a method for coupling a trailer to an industrial truck, wherein the industrial truck is equipped with a jaw coupling that comprises a coupling body and a coupling pin, wherein the method is developed in that the industrial truck comprises a control unit, at least one locking sensor and a locking actuator that are coupled by communication technology to each other, wherein a locking sensor recognizes whether a coupling eye of a drawbar of a trailer is located in or close to a locking position within the coupling body, wherein in the locking position, the opening in the coupling eye is flush with the coupling pin so that, to couple the trailer, the coupling pin can be shoved through the coupling eye, the control unit receives and evaluates signals from the locking sensor and, in an instance in which the locking sensor recognizes that the coupling eye is located in or near the locking position, the control unit controls the locking actuator so that it actuates the coupling pin, and the coupling pin is shoved through the coupling eye.

The same or similar advantages as already explained with respect to the industrial truck also apply to the method. Repetitions will be avoided.

Advantageously, the method is developed in that the locking sensor recognizes without contact, in particular optically, whether the coupling eye of the drawbar of the trailer is in or near the locking position.

Furthermore, the method is advantageously further developed in that the industrial truck comprises a height adjustment ramp that extends between a first area close to the ground and a second area close to a section of the coupling body that forms a bottom part of the coupling mouth, wherein the height adjustment ramp extends in a direction facing away from the industrial truck in which the jaw coupling opens, and wherein the height adjustment ramp is configured to receive the coupling eye of the drawbar of the trailer and lead to a coupling height at which the coupling eye can be received by the jaw coupling.

According to another embodiment, the method is further developed in that the industrial truck furthermore comprises a proximity sensor that detects the presence of the coupling eye within a sensor area and that is coupled by communication technology to the control unit, wherein the control unit receives and evaluates signals from the proximity sensor and, in an instance in which the proximity sensor recognizes that the coupling eye is located in a sensor area, controls a traction drive of the industrial truck such that a driving speed of the industrial truck does not exceed a limit value for a provided approach speed. In particular, the sensor area extends within a section of the height adjustment ramp. In other words, it is detected in particular whether the coupling eye is located in a corresponding section of the height adjustment ramp.

The method is further developed according to another advantageous embodiment in that the industrial truck comprises a personal security sensor that monitors a personal protection safety area, wherein the personal protection safety area extends from a rear wall of the industrial truck in a direction facing away from the industrial truck in which the jaw coupling opens, wherein the personal security sensor is coupled by communication technology to the control unit, and the control unit receives and evaluates signals from the personal security sensor and, in an instance in which the personal security sensor recognizes that a person is located within the personal protection safety area, the locking actuator is controlled so that the coupling pin is not actuated as long as the person is located within the personal protection safety area.

According to another advantageous embodiment, the method is developed in that the industrial truck comprises an environment monitoring sensor that covers an additional protection field within an environment of the industrial truck, wherein the control unit establishes whether the coupling pin is in an open or in a closed position, and wherein the control unit changes a position, shape, extent and/or area of the additional protection field depending on the position of the coupling pin.

According to another exemplary embodiment, it is provided that in an instance in which the control unit establishes that the coupling pin is in the closed position, the additional protection field covered by the at least one environmental monitoring sensor is expanded to an area that extends from the jaw coupling in a direction facing away from the industrial truck in which the jaw coupling opens, and extends at least up to a given distance that in particular at least approximately corresponds to a drawbar length of a trailer.

According to another exemplary embodiment, it is provided that the control unit only activates the additional protection field in an area in which the jaw coupling is present when it can be established by the control unit that the coupling pin is in an open position, and the industrial truck is stationary or driving in reverse. This additional protection field covered by the at least one environment monitoring sensor also extends from the jaw coupling in a direction facing away from the industrial truck in which the jaw coupling opens, and namely at least up to a given distance that in particular corresponds at least approximately to a drawbar length of a trailer.

According to another advantageous exemplary embodiment, the control unit changes the position, shape, extent and/or area of the additional protection field not just depending on the position of the coupling pin, but also depending on a steering angle of the industrial truck. In this context, it is in particular provided that the additional protection field is expanded on the right side of the industrial truck in the event of a rightward steering angle that exceeds a given limit value. Analogously, it is furthermore provided in particular that the additional protection field is expanded on the left side of the industrial truck in the event of a leftward steering angle that exceeds a given additional limit value. It is also provided that further additional protection fields are defined. The expansion of the additional protection fields and/or the redefinition of further additional protection fields is carried out for example by using the additional sensors arranged on the industrial truck.

Finally, the method is furthermore developed in particular in that the control unit establishes that the locking actuator has shoved the coupling pin through the coupling eye and that a traction drive has then set the industrial truck in motion, wherein after the traction drive has set the industrial truck in motion, the control unit furthermore receives and evaluates signals from the locking sensor for at least a given time period and, in an instance in which an evaluation of the signals indicates that the coupling eye is not located in the locking position, stops the traction drive of the industrial truck.

Further features of the invention will become apparent from the description of embodiments according to the invention together with the claims and the attached drawings. Embodiments according to the invention can fulfill individual features or a combination of several features.

In the scope of the invention, features which are designated by "in particular" or "preferably" are understood to be optional features.

BRIEF DESCRIPTION OF THE DRAWINGS

The invention is described below, without restricting the general idea of the invention, based on exemplary embodiments in reference to the drawings, whereby we expressly refer to the drawings with regard to all details according to the invention that are not explained in greater detail in the text. In the figures.

In the drawings, the same or similar elements and/or parts are always provided with the same reference numbers; a reintroduction will therefore always be omitted.

DETAILED DESCRIPTION OF THE INVENTION

Figure 1:
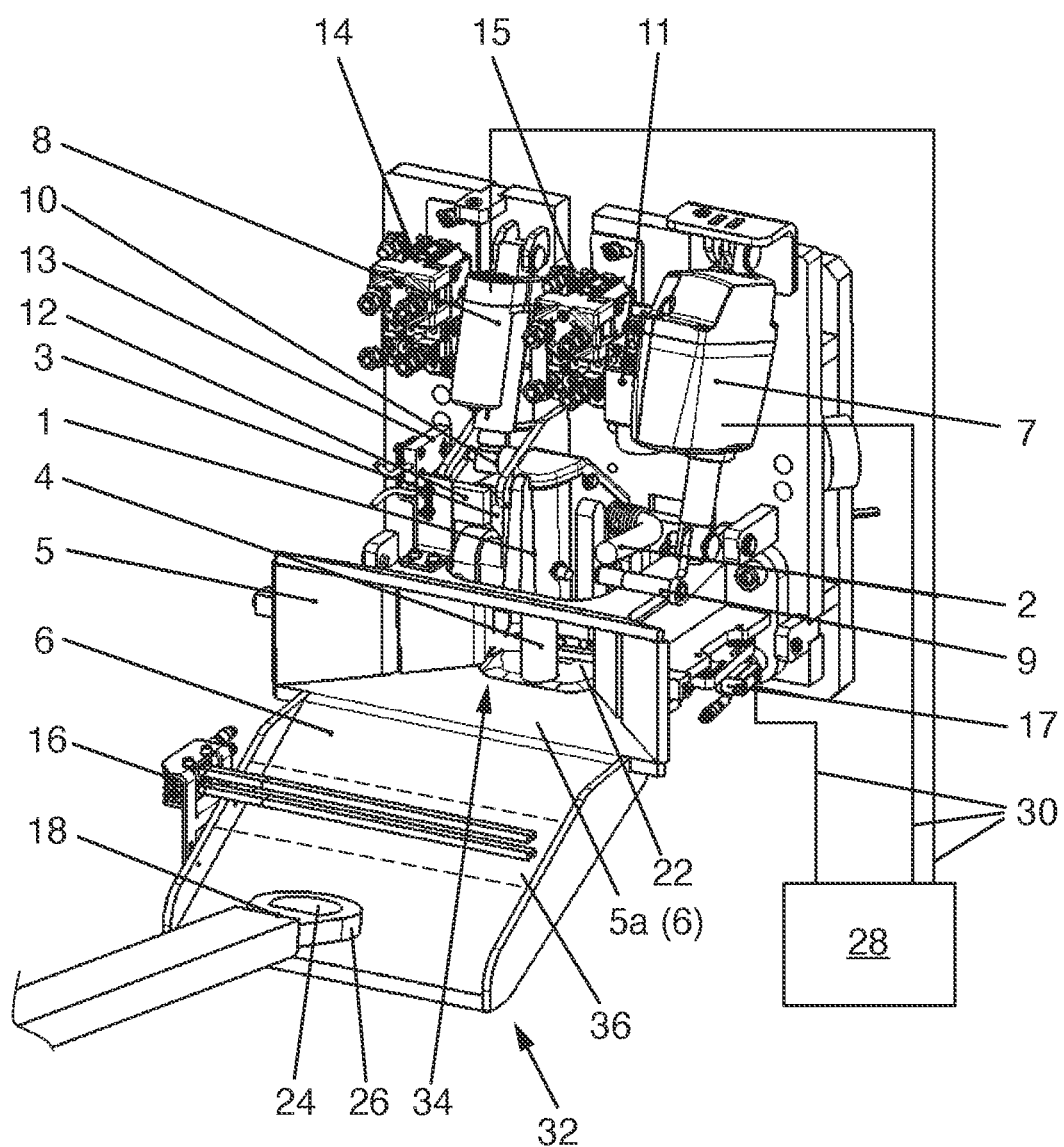
FIG. 1 shows a schematically simplified perspective view of a detail of an industrial truck in the area of a jaw coupling attached for example to the rear of the industrial truck.

In a schematically simplified perspective view, FIG. 1 shows a detail of a rear wall of an industrial truck 21 to which a jaw coupling 1 is attached. The jaw coupling 1 comprises a coupling body 22 of which only a lower leg is visible in FIG. 1. A coupling pin 4 extends through the coupling body 22 and, in a coupled state, extends through an opening 24 in a coupling eye 26 of a drawbar 18 of a trailer that is not completely shown in FIG. 1. Also comprised is a locking sensor 17 that for example is an optical sensor. The locking sensor 17 is configured to recognize whether the coupling eye 26 of the drawbar 18 is located in or near a locking position within the coupling body 22. The coupling eye 26 is located in the locking position when the opening 24 in the coupling eye 26 is flush with the coupling pin 4 so that the coupling pin 4 can be shoved through the coupling eye 26 to couple the trailer. A coupling process can also occur successfully when the coupling eye 26 is not located precisely in the locking position, but rather directly in front. According to such an embodiment, the locking sensor 17 can already release the locking bolt 4 just before the coupling eye 26 has reached the locking position. The coupling pin 4 contacts the drawbar, and as the industrial truck 21 continues to back up, the coupling pin 4 slides into the coupling eye 26.

The industrial truck 21 furthermore comprises a control unit 28 that is coupled by communication technology to at least the locking sensor 17 and to a locking actuator 8. For this purpose, there are suitable data links 30 in the industrial truck 21 that are only schematically represented in FIG. 1. Contrary to the illustration in FIG. 1, the control unit 28 is furthermore for example not implemented as separate unit, but is for example provided as software means in the central operation control unit of the industrial truck 21.

The control unit 28 is configured to receive and evaluate signals from the locking sensor 17. In an instance in which the locking sensor 17 recognizes that that the coupling eye 26 is located in or near the locking position within the coupling body 22, the control unit 28 controls the locking actuator 8 such that it actuates the coupling pin 4, and the coupling pin 4 is shoved through the coupling eye 26. Accordingly, the trailer is automatically coupled once the coupling eye 26 of the drawbar 18 is located in the suitable locking position.

The jaw coupling 1 furthermore comprises an insertion funnel 5 that guides the coupling eye 26 of the drawbar 18 in the direction of the coupling body 22, and therefore in the direction of the locking position. The insertion funnel 5 makes it possible to position the jaw coupling 1 of the industrial truck 21 and the drawbar 18 of the trailer with greater tolerance relative to each other, which accelerates the coupling process and increases the turnover capacity of the industrial truck 21. A height adjustment ramp 6 adjoins the insertion funnel 5 in a direction in which the jaw coupling 1 opens. The height adjustment ramp 6 extends between a first area 32 close to the ground, and a second area 34 that is arranged close to a section of the coupling body 22, and that forms the bottom part of the coupling jaw and is visible in FIG. 1. A bottom part of the insertion funnel 5a that directly adjoins the height adjustment ramp 6 is also considered to be part of the height adjustment ramp 6. The height adjustment ramp 6 is configured to receive the coupling eye 26 of the drawbar 18 of the trailer and guide it up to a coupling height at which the coupling eye 26 can be received by the jaw coupling 1. The height adjustment ramp 6 makes it possible to couple the trailer with different drawbar heights. This is particularly advantageous if many trailers are already being used by a customer, and retrofitting these trailers to a uniform drawbar height would be uneconomical.

A proximity sensor 16 is attached to the height adjustment ramp 6 and is configured to detect the presence of the coupling eye 26 in a sensor area 36 of the height adjustment ramp 6. The proximity sensor 16 is also coupled by communication technology to the control unit 28. A data link 30 that is not shown in FIG. 1 is available for this. The control unit 28 is configured to receive and evaluate signals from the proximity sensor 16. In an instance in which the proximity sensor 16 recognizes that the coupling eye 26 is located in the sensor area 36 of the height adjustment ramp 6, the control unit 28 is configured to control a traction drive of the industrial truck 21 such that a driving speed of the industrial truck 21 does not exceed a given limit value for a provided approaching speed. In other words, the industrial truck 21 drives backwards in the direction of the drawbar 18 of the trailer at a specific speed, for example at a speed of 0.3 m/s. The approach speed is intentionally chosen to be relatively high. It is chosen to be high enough that protection fields are not quite needed to operate the industrial truck 21.

The maximum possible speed for such an operation of the industrial truck 21 should be selected in order to exploit the kinetic energy of the drawbar 18 to move the coupling eye 26 up the height adjustment ramp 6 into the locking position. This is in particular important with light trailers that have a low mass inertia. If such a trailer that is light because for example it is empty were to be approached at too low a speed, it would only be pushed away from the industrial truck 21; the coupling eye 26 of the drawbar 18 would however not move up the height adjustment ramp 6. Only when the coupling eye 26 is detected in the sensor area 36 by the proximity sensor 16 is the driving speed of the industrial truck 21 significantly reduced, if possible so that a smooth coupling process occurs, and the industrial truck at least approximately comes to a stop precisely at the moment in which the coupling eye 26 is located in the locking position. The final stop of the industrial truck 21 can also be triggered in this context by means of the locking sensor 17. In other words, the industrial truck 21 is therefore fully stopped once the coupling eye 26 is located in the locking position.

Alternatively to the described exemplary embodiment, the industrial truck 21 can be designed without a height adjustment ramp 6. In such an instance, the sensor area 36 extends behind the industrial truck 21, i.e., in a direction in which the jaw coupling opens, and which faces away from the rear wall of the industrial truck 21. Even with such an exemplary embodiment, the functionality of the sensor area 36, however, remains as described above.

The coupling process can be described in summary as follows: The locking sensor 17 recognizes the presence of the coupling eye 26 of the drawbar 18. The corresponding signal from the locking sensor 17 is processed in the control unit 28, and the locking actuator 8, that is for example a hydraulic closing cylinder, is controlled. This is done by the actuating lever 10 that interacts with a lever 3 to close the jaw coupling 1. A proximity sensor 12 recognizes that the lever 3 for closing the jaw coupling 1 is in the closed position, and sends a signal to the control unit 28 that the jaw coupling 1 is closed. In this case as well, there is also a data link 30, which is not shown in FIG. 1, between the proximity sensor 12 and the control unit 28. The locking actuator 8 again travels to its home position, and the other proximity sensor 13 recognizes the home position of the locking actuator 8. The coupling process is completed.

After the coupling process, the industrial truck 21 with the trailer drives to a destination or an uncoupling point. During the initial seconds of driving, the control unit 28 checks whether the trailer was actually successfully coupled; otherwise, it stops the industrial truck 21 from driving. To accomplish this, the control unit 28 is configured to ascertain that the locking actuator 8 has actually shoved the coupling pin 4 through the coupling eye 26. Furthermore, the control unit 28 checks whether the traction drive has set the industrial truck 21 in motion and then, for example a few seconds after the traction drive has set the industrial truck 21 in motion, checks the signals from the locking sensor 17. In an instance in which the evaluation of the signals from the locking sensor 17 shows that the coupling eye 26 is not located in the locking position, the control unit 28 stops the industrial truck 21. The coupling process can then be done manually.

To uncouple the trailer, an uncoupling actuator 7, that is for example also a hydraulic cylinder, is controlled. By means of an actuating lever 9, said uncoupling actuator 7 interacts with a lever 2 to open the jaw coupling 1. By actuating the lever 2, the coupling pin 4 is opened. When the lever 2 has reached an upper position, this is ascertained by another proximity sensor 11. Then the uncoupling actuator 7 travels back to its home position, and the coupling pin 4 remains in the open position. Another signal can be sent by the other proximity sensor 12 to the control unit 28 so that the industrial truck 21 is ready to drive again. If the industrial truck 21 starts driving, the drawbar 18 slips out of the jaw coupling 1, and the industrial truck 21 is available for the next transport process. The uncoupling actuator 7 and the locking actuator 8 are supplied with corresponding power through the two reversing contactors 14, 15.

Figure 2:
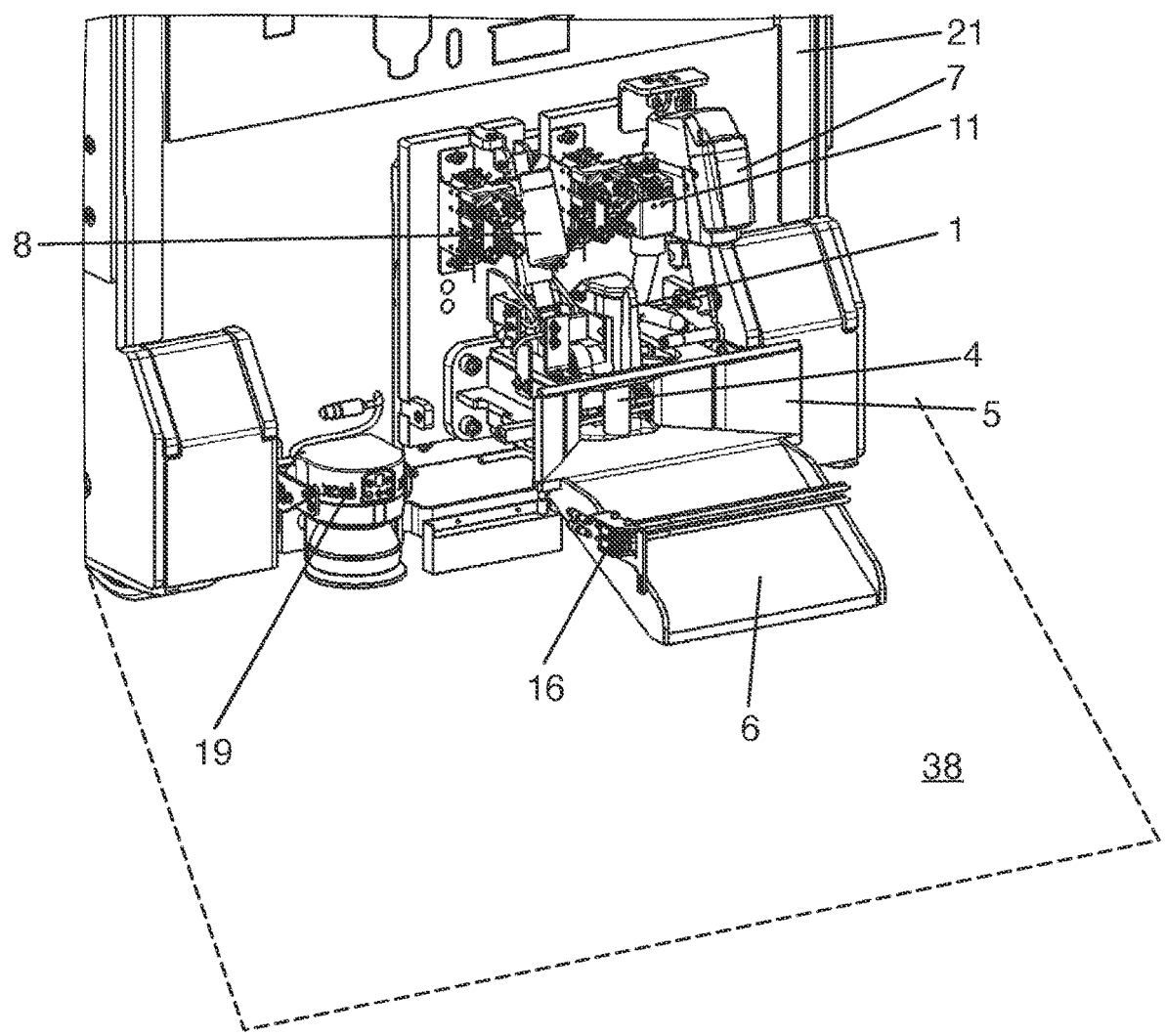
FIG. 2 shows a schematically simplified perspective view of a rear section of the industrial truck in which for example the jaw coupling is attached.

In a schematically simplified perspective view, FIG. 2 shows a rear area of the industrial truck 21 to which the jaw coupling 1 is attached. A personal security sensor 19 that is configured to monitor a personal protection safety area 38 is on the industrial truck 21 in this area. The personal protection safety area 38 extends from a rear wall of the industrial truck 21 in a direction that faces away from the industrial truck 21 and in which the jaw coupling 1 opens. The personal security sensor 19 is also coupled by communication technology to the control unit 28, which is not shown in FIG. 2. In this case as well, a suitable data link 30 is also provided, which is also not shown. The control unit 28 is configured to receive and evaluate signals from the personal security sensor 19, and in an instance in which the personal security sensor 19 recognizes that a person is located in the personal protection safety area 38, controls the locking actuator 8 such that the coupling pin 4 is not actuated as long as the person is located in the personal protection safety area 38. This safety function ensures that the locking pin 4 is not accidentally triggered if the locking sensor 17 is triggered for example by reaching into the coupling body 22.

Figure 3:
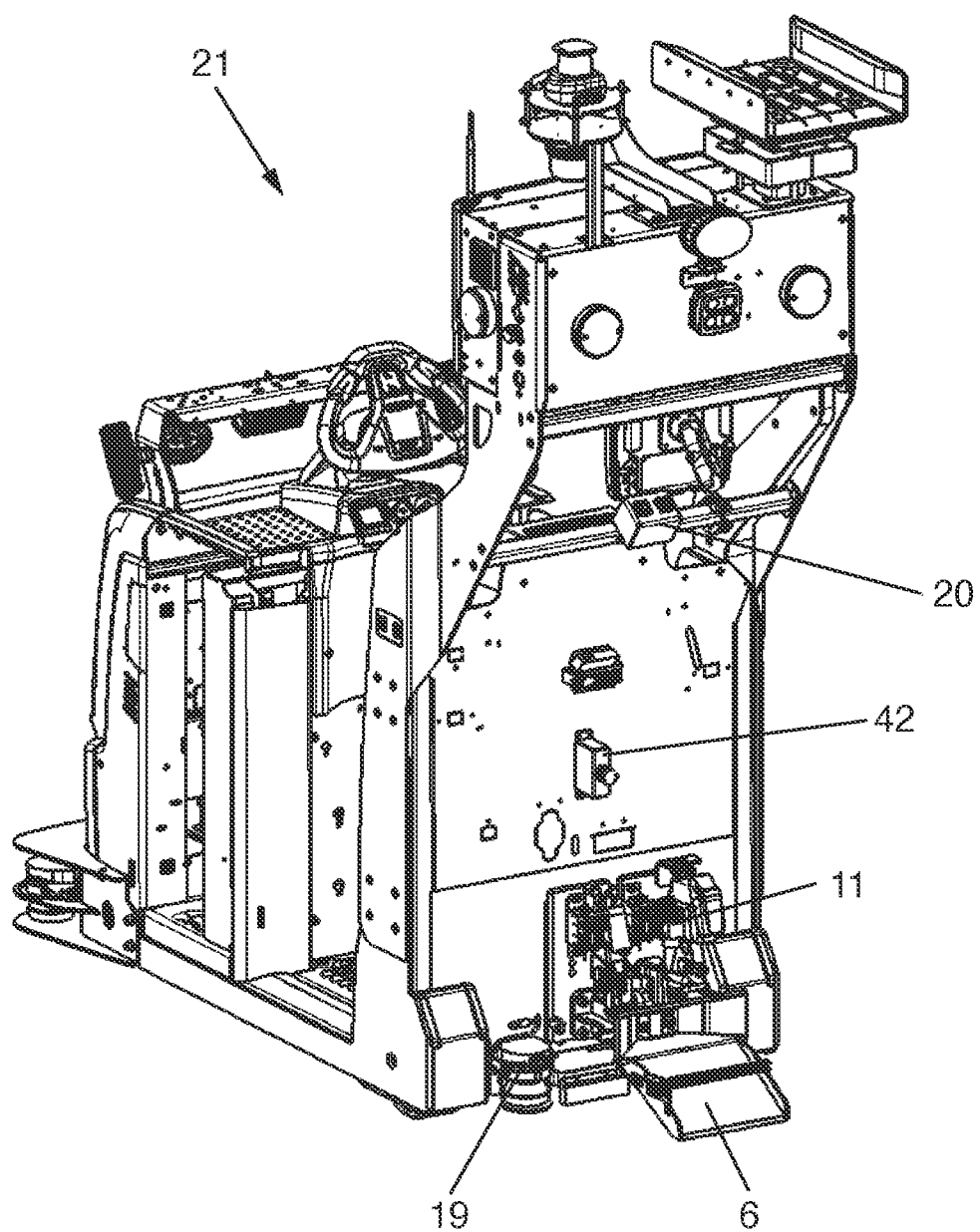
FIG. 3 shows a schematically simplified prospective view of an industrial truck comprising a jaw coupling.

FIG. 3 shows a schematically simplified perspective view of the industrial truck 21. On its rear, this comprises an actuating element 20 that is configured to manually control the locking actuator 8 so that it actuates the coupling pin 4 such that the coupling pin 4 is shoved through the coupling eye 26. The actuating element 20 is therefore suitable in particular for executing a manual coupling process. As shown in FIG. 3, the industrial truck 21 is for example a driverless transport vehicle.

Figure 4:
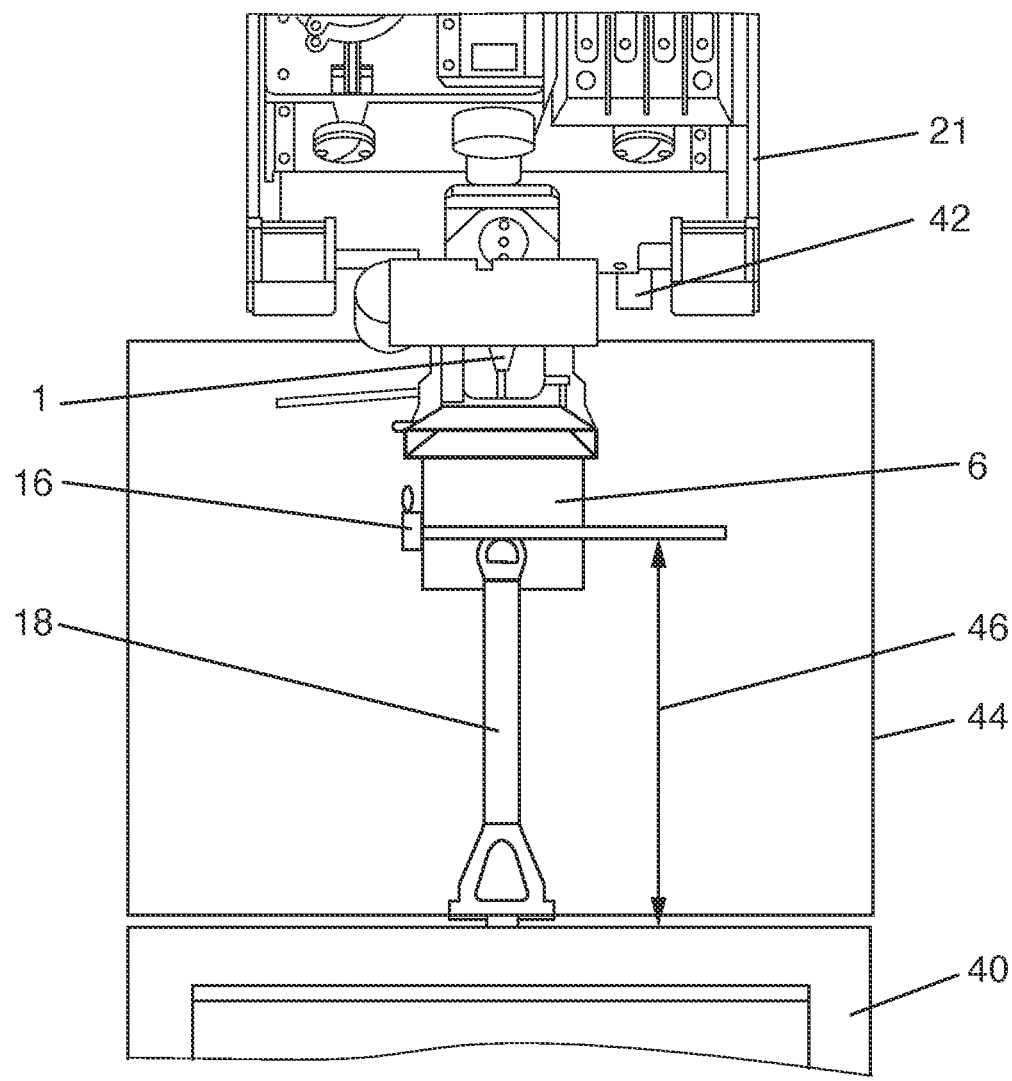
FIG. 4 shows a schematically simplified plan view of a sectionally portrayed industrial truck and a sectionally portrayed trailer.

The schematically simplified plan view in FIG. 4 shows a rear area of the industrial truck 21 and a section of the trailer 40. Preferably, the industrial truck 21 and the trailer 40 form a system. Located on the rear of the industrial truck 21 is for example an environment monitoring sensor 42 that is configured to cover an additional protection field 44 in an environment of the industrial truck 21. Alternatively, the personal security sensor 19, and possibly other sensors present on the industrial truck 21, can be used for this purpose. The control unit 28 is configured to ascertain whether the coupling pin 4 is located in an open or in a closed position. Furthermore, the control unit 28 is configured to change a position, shape, extent and/or area of the additional protection field 44 depending on the position of the coupling pin 4.

The additional protection field 44 extends for example between a rear side of the industrial truck 21 and a front side of the trailer 40. It serves to ensure that no people are located within this area that is to be considered a hazardous area during the towing operation and the coupling process. The control unit 28 is configured to ascertain whether the coupling pin 4 is located in an open or in a closed position. This is accomplished for example by reading out the signals from the proximity sensors 11 to 13. When the coupling pin 4 is in the closed position, the additional protection field 44 is expanded to the area shown in FIG. 4 that extends from the jaw coupling 1 in a direction facing away from the industrial truck 21 in which the jaw coupling 1 opens. The additional protection field 44 extends at least approximately as far as a drawbar length 46 of the drawbar 18 of the trailer 40.

According to another exemplary embodiment, the control unit 28 is configured to only activate the additional protection field 44 in an area in which the jaw coupling is present when the control unit 28 establishes that the coupling pin 4 is in an open position, and the industrial truck 21 is stationary or driving in reverse. This additional protection field 44 covered for example by the at least one environment monitoring sensor 42 or the personal security sensor 19 can extend from the jaw coupling 1 in a direction facing away from the industrial truck 21 in which the jaw coupling 1 opens, and namely at least up to a given distance that in particular corresponds at least approximately to a drawbar length 46 of a trailer 40.

Figure 5:
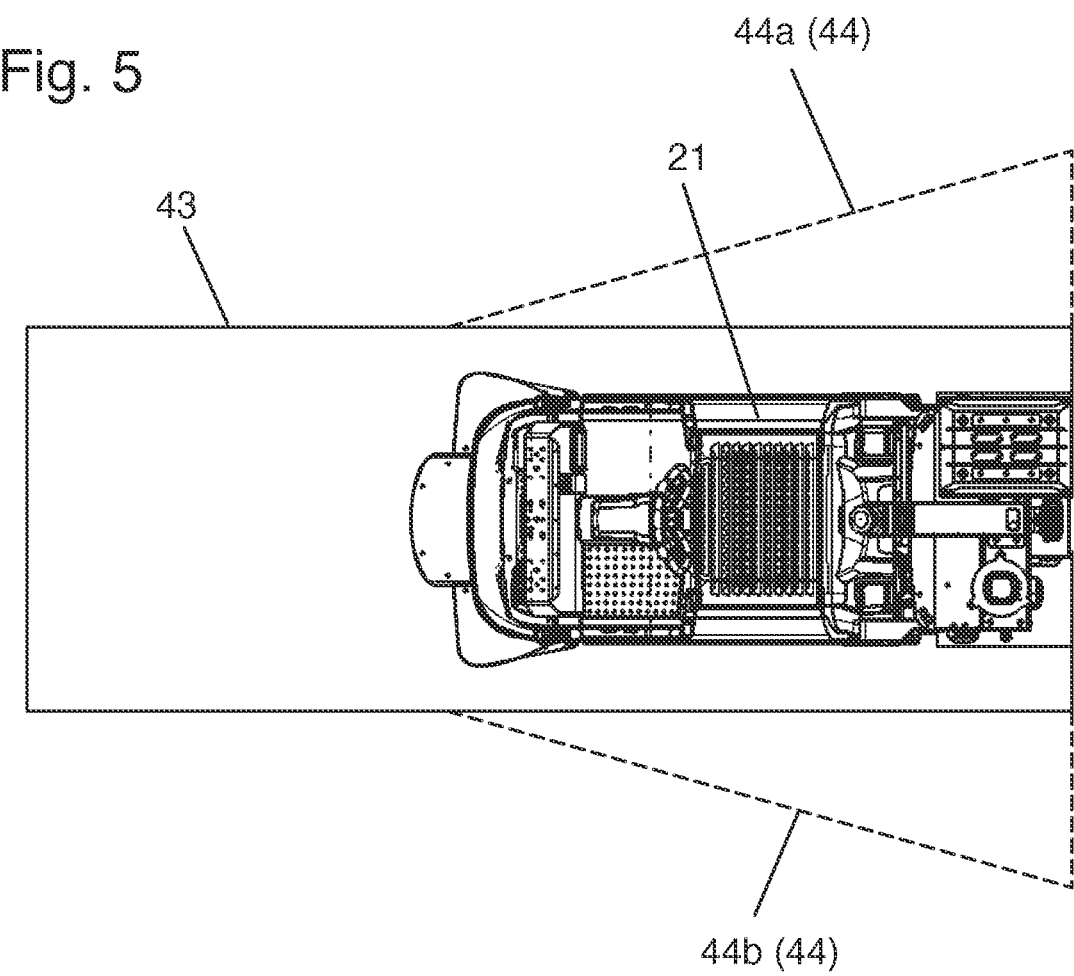
FIG. 5 shows a schematically simplified plan view of an industrial truck with different protection areas.

FIG. 5 shows a schematically simplified plan view of an industrial truck 21. As is routine with autonomously or partially autonomously driving vehicles, a protection field 43 stretches out around the industrial truck 21. To accomplish this, there are different sensors on the industrial truck 21. According to another advantageous exemplary embodiment, the control unit 28 is configured to change a position, shape, extent and/or area of the protection field 43, or to define additional protection fields. For example, an additional protection field 44 is defined that can change not only depending on the position of the coupling pin 4, but also depending on a steering angle of the industrial truck 21.

In this context, it is in particular provided that the protection field 43 is increased by the additional protection field 44a on the right side of the industrial truck 21 in the event of a rightward steering angle that exceeds a given limit value. Analogously, it is furthermore provided in particular that the protection field 43 is increased by the additional protection field 44b on the left side of the industrial truck 21 in the event of a leftward steering angle that exceeds a given additional limit value.

Figure 6:
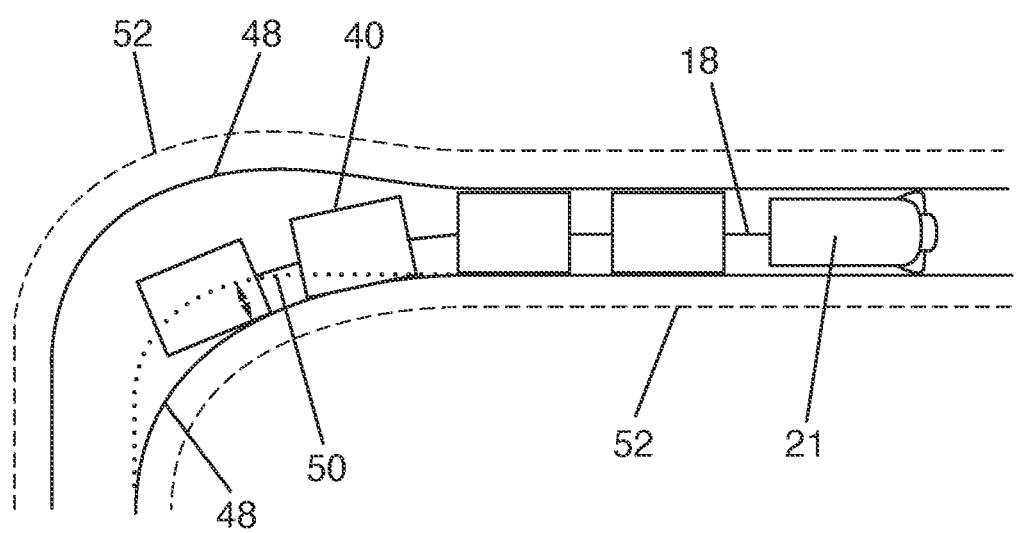
FIG. 6 shows a schematically simplified plan view of an industrial truck with several trailers while cornering.

FIG. 6 shows a schematically simplified plan view of an industrial truck 21 with several trailers 40 while cornering.

A solid line shows an actual driving area 48 of the towing combination, i.e., an area that is covered by the industrial truck 21 or the trailers 40. A dotted line shows a border of a driving area 50 in the area of the curve that is covered by the industrial truck 21 alone, i.e., without the trailers 40. It is generally known that trailers 40 travel a radius that lies further to the inside than the towing vehicle, in this case the industrial truck 21, when cornering. This results in a deviation from the covered areas 48, 50 in the curves, the maximum of which is marked with an arrow.

To take into account this effect with regard to the design of the shape and size of the protection field, the adaptation of the protection field 43 described in conjunction with FIG. 5 is made. In FIG. 6, a dashed line shows the area 52 covered by the additional protection field 44. The trailers 40 that run further to the inside while cornering also do not leave this area 52. Advantageously according to the aforementioned embodiments, an industrial truck that can be used as a towing vehicle is provided that on the one hand can be operated autonomously, and that on the other hand offers an extremely high level of security.

The dimensions of the personal protection safety area 38 can be adapted to the individual application, for example the design of the trailer 40. It should be taken into account that the trailer 40 itself is not recognized as an obstacle since a coupling process is otherwise impossible. If the personal protection safety area 38 is violated while driving the industrial truck 21 in reverse, the industrial truck 21 stops and only continues driving when the personal protection safety area 38 is free. In addition, all automatic coupling functions are interrupted.

All named features, including those taken from the drawings alone as well as individual features that are disclosed in combination with other features, are considered, alone and in combination, to be essential for the invention. Embodiments according to the invention can be fulfilled by individual features or a combination of several features.

LIST OF REFERENCE NUMBERS

1 Jaw coupling
2 Lever for opening
3 Lever for closing
4 Coupling pin
5 Insertion funnel
5a Lower section
6 Height adjustment ramp
7 Uncoupling actuator
8 Locking actuator
9 Actuating lever for opening
10 Actuating lever for closing
11, 12, 13 Proximity sensors
14, 15 Reversing contactors
16 Proximity sensor
17 Locking sensor
18 Drawbar
19 Personal security sensor
20 Actuating element
21 Industrial truck
22 Coupling body
24 Opening
26 Coupling eye
28 Control unit
30 Data link
32 First area
34 Second area
36 Sensor area
38 Personal protection safety area
40 Trailer
42 Environmental monitoring sensor
43 Protection field
44, 44a, 44b Additional protection field
46 Drawbar length
48 Driving area of the combination
50 Driving area of the industrial truck
52 Covered area

What is claimed is:

1. An industrial truck having
a jaw coupling that comprises a coupling body and a coupling pin, and
a control unit, at least one locking sensor and a locking actuator that are coupled by communication technology to each other,
wherein the at least one locking sensor is configured to recognize whether a coupling eye of a drawbar of a trailer is located in or close to a locking position within the coupling body,
wherein in the locking position, an opening in the coupling eye is flush with the coupling pin so that, to couple the trailer, the coupling pin is able to be shoved through the coupling eye,
wherein the control unit is configured to receive and evaluate signals from the at least one locking sensor and, in an instance in which the at least one locking sensor recognizes that the coupling eye is located in or near the locking position, the control unit is configured to control the locking actuator so that it actuates the coupling pin such that the coupling pin is shoved through the coupling eye
wherein a proximity sensor is configured to detect the presence of the coupling eye within a sensor area, wherein the proximity sensor is coupled by communication technology to the control unit, and
wherein the control unit is configured to receive and evaluate signals from the proximity sensor and, in an instance in which the proximity sensor recognizes that the coupling eye is located in a sensor area, to control a traction drive of the industrial truck when the industrial truck is not coupled to the trailer such that a driving speed of the industrial truck does not exceed a limit value for a provided approach speed.

2. The industrial truck according to claim 1, wherein the at least one locking sensor is a contactless sensor.

3. The industrial truck according to claim 2, wherein the contactless sensor is an optical sensor.

4. The industrial truck according to claim 1, wherein a height adjustment ramp extends between a first area close to the ground and a second area close to a section of the coupling body that forms a bottom part of a coupling mouth, wherein the height adjustment ramp extends in a direction facing away from the industrial truck in which the jaw coupling opens, and wherein the height adjustment ramp is configured to receive the coupling eye of the drawbar of the trailer and lead to a coupling height at which the coupling eye is receivable by the jaw coupling.

5. The industrial truck according to claim 4, wherein a proximity sensor is configured to detect the presence of the coupling eye within a sensor area, wherein the proximity sensor is coupled by communication technology to the control unit, wherein the control unit is configured to receive and evaluate signals from the proximity sensor and, in an instance in which the proximity sensor recognizes that the coupling eye is located in a sensor area, to control a traction drive of the industrial truck such that a driving speed of the industrial truck does not exceed a limit value for a provided approach speed, and wherein the sensor area is present within a section of the height adjustment ramp.

6. The industrial truck according to claim 1, wherein a personal security sensor is configured to monitor a personal protection safety area, wherein the personal protection safety area extends from a rear wall of the industrial truck in a direction facing away from the industrial truck in which the jaw coupling opens, wherein the personal security sensor is coupled by communication technology to the control unit, and wherein the control unit is configured to receive and evaluate signals from the personal security sensor and, in an instance in which the personal security sensor recognizes that a person is located within the personal protection safety area, to control the locking actuator so that the coupling pin is not actuated as long as the person is located within the personal protection safety area.

7. The industrial truck according to claim 1, wherein at least one environment monitoring sensor is configured to cover an additional protection field within an environment of the industrial truck, wherein the control unit is configured to establish whether the coupling pin is in an open or in a closed position, and wherein the control unit is configured to change a position, shape, extent and/or area of the additional protection field depending on the position of the coupling pin.

8. The industrial truck according to claim 1, wherein the control unit is configured to establish that the locking actuator has shoved the coupling pin through the coupling eye, and that a traction drive has then set the industrial truck in motion, wherein after the traction drive has set the industrial truck in motion, and wherein the control unit is further configured to receive and evaluate signals from the at least one locking sensor for at least a given time period and, in an instance in which an evaluation of the signals indicates that the coupling eye is not located in the locking position, to stop the traction drive of the industrial truck.

9. The industrial truck according to claim 1, wherein an actuating element is configured to manually control the locking actuator so that it actuates the coupling pin such that the coupling pin is shoved through the coupling eye.

10. The industrial truck according to claim 1, wherein the industrial truck is a driverless transport vehicle.

11. A system comprising:
an industrial truck having
a jaw coupling that comprises a coupling body and a coupling pin, and
a control unit, at least one locking sensor and a locking actuator that are coupled by communication technology to each other, and
a trailer with a drawbar with a coupling eye;
wherein the at least one locking sensor is configured to recognize whether the coupling eye of the drawbar of the trailer is located in or close to a locking position within the coupling body,
wherein in the locking position, an opening in the coupling eye is flush with the coupling pin so that, to couple the trailer, the coupling pin is able to be shoved through the coupling eye,
wherein the control unit is configured to receive and evaluate signals from the at least one locking sensor and, in an instance in which the at least one locking sensor recognizes that the coupling eye is located in or near the locking position, the control unit is configured to control the locking actuator so that it actuates the coupling pin such that the coupling pin is shoved through the coupling eye
wherein the industrial truck further comprises a proximity sensor configured to detect the presence of the coupling eye within a sensor area,
wherein the proximity sensor is coupled by communication technology to the control unit, and
wherein the control unit is configured to receive and evaluate signals from the proximity sensor and, in an instance in which the proximity sensor recognizes that the coupling eye is located in a sensor area, to control a traction drive of the industrial truck when the industrial truck is not coupled to the trailer such that a driving speed of the industrial truck does not exceed a limit value for a provided approach speed.

12. A method for coupling a trailer to an industrial truck, wherein the industrial truck is equipped with
a jaw coupling that comprises a coupling body and a coupling pin, and
a control unit, at least one locking sensor and a locking actuator that are coupled by communication technology to each other,
wherein a locking sensor recognizes whether a coupling eye of a drawbar of the trailer is located in or close to a locking position within the coupling body,
wherein in the locking position, an opening in the coupling eye is flush with the coupling pin so that, to couple the trailer, the coupling pin is able to be shoved through the coupling eye,
wherein the control unit receives and evaluates signals from the locking sensor and, in an instance in which the locking sensor recognizes that the coupling eye is located in or near the locking position, the control unit controls the locking actuator so that it actuates the coupling pin, and the coupling pin is shoved through the coupling eye,
wherein the industrial truck further comprises a proximity sensor that detects the presence of the coupling eye within a sensor area and is coupled by communication technology to the control unit, and
wherein the control unit receives and evaluates signals from the proximity sensor and, in an instance in which the proximity sensor recognizes that the coupling eye is located in the sensor area, controls a traction drive of the industrial truck when the industrial truck is not coupled to the trailer such that a driving speed of the industrial truck does not exceed a limit value for a provided approach speed.

13. The method according to claim 12, wherein the locking sensor recognizes without contact, whether the coupling eye of the drawbar of the trailer is in or near the locking position.

14. The method according to claim 13, wherein the locking sensor optically recognizes whether the coupling eye of the drawbar of the trailer is in or near the locking position.

15. The method according to claim 12, wherein the industrial truck comprises a height adjustment ramp that extends between a first area close to the ground and a second area close to a section of the coupling body that forms a bottom part of a coupling mouth, wherein the height adjustment ramp extends in a direction facing away from the industrial truck in which the jaw coupling opens, and wherein the height adjustment ramp is configured to receive the coupling eye of the drawbar of the trailer and lead to a coupling height at which the coupling eye is received by the jaw coupling.

16. The method according to claim 12, wherein the sensor area is present with a section of the height adjustment ramp.

17. The method according to claim 12, wherein the industrial truck comprises a personal security sensor that monitors a personal protection safety area, wherein the personal protection safety area extends from a rear wall of the industrial truck in a direction facing away from the industrial truck in which the jaw coupling opens, wherein the personal security sensor is coupled by communication technology to the control unit, and wherein the control unit receives and evaluates signals from the personal security sensor and, in an instance in which the personal security sensor recognizes that a person is located within the personal protection safety area, controls the locking actuator so that the coupling pin is not actuated as long as the person is located within the personal protection safety area.

18. The method according to claim 12, wherein the industrial truck comprises an environment monitoring sensor that covers an additional protection field within an environment of the industrial truck, wherein the control unit establishes whether the coupling pin is in an open or in a closed position, and wherein the control unit changes a position, shape, extent and/or area of the additional protection field depending on the position of the coupling pin.

19. The method according to claim 12, wherein the control unit establishes that the locking actuator has shoved the coupling pin through the coupling eye and that a traction drive has then set the industrial truck in motion, wherein after the traction drive has set the industrial truck in motion, the control unit receives and evaluate signals from the locking sensor for at least a given time period and, in an instance in which an evaluation of the signals indicates that the coupling eye is not located in the locking position, stops the traction drive of the industrial truck.

* * * * *